United States Patent
Xu et al.

(10) Patent No.: US 12,487,616 B2
(45) Date of Patent: Dec. 2, 2025

(54) ADAPTIVE CONTROL FOR INPUT CURRENT LIMIT SETTING

(71) Applicant: NVIDIA Corporation, Santa Clara, CA (US)

(72) Inventors: Ziyi Xu, Shenzhen (CN); Zheng Wu, San Jose, CA (US); Ben Pei En Tsai, Uusimaa (FI)

(73) Assignee: Nvidia Corporation, Santa Clara, CA (US)

( * ) Notice: Subject to any disclaimer, the term of this patent is extended or adjusted under 35 U.S.C. 154(b) by 240 days.

(21) Appl. No.: 18/221,198

(22) Filed: Jul. 12, 2023

(65) Prior Publication Data
US 2025/0021118 A1    Jan. 16, 2025

(51) Int. Cl.
*G05F 1/46* (2006.01)

(52) U.S. Cl.
CPC ..................... *G05F 1/46* (2013.01)

(58) Field of Classification Search
CPC ........................................... G05F 1/46
See application file for complete search history.

(56) References Cited

U.S. PATENT DOCUMENTS

| | | | |
|---|---|---|---|
| 11,223,273 B2 * | 1/2022 | Chang | H02M 1/0025 |
| 2007/0216391 A1 * | 9/2007 | Blanken | H02M 3/156 323/351 |
| 2008/0068866 A1 * | 3/2008 | Blanken | H02M 3/1588 363/21.01 |
| 2014/0055107 A1 * | 2/2014 | Tsuruoka | H02M 3/02 323/234 |
| 2018/0219485 A1 * | 8/2018 | Babazadeh | H02M 3/3376 |

* cited by examiner

*Primary Examiner* — Lee E Rodak
*Assistant Examiner* — Zannatul Ferdous
(74) *Attorney, Agent, or Firm* — Lowenstein Sandler LLP

(57) ABSTRACT

Technologies directed to control circuits to adjust input current settings of input current limiter (ICL) circuits are described. One integrated circuit includes a processing core, an ICL circuit, and a control circuit. The ICL circuit has a first input current setting to limit an input current signal provided to the processing core to a current limit. The control circuit can receive digital samples from the ICL circuit with the first input current setting in response to one or more transient response tests. Using the digital samples, the control circuit can determine a response characteristic of a transient response of the input current signal. The control circuit can adjust the first input current setting to a second input current setting until the response characteristic satisfies a condition.

18 Claims, 10 Drawing Sheets

ADAPTIVE CONTROL FOR INPUT CURRENT LIMIT SETTING

TECHNICAL FIELD

At least one embodiment pertains to an input current limiter (ICL) circuit for controlling an input current limit circuit based on load conditions. For example, at least one embodiment pertains to technology for dynamically adjusting an input current setting of the ICL circuits to improve ICL performance.

BACKGROUND

Frequency-voltage control (FVC) is a technique used to regulate an output voltage of a voltage regulator while maintaining a limit on an input current. This technique is commonly used in power electronics applications, such as DC-DC converters, AC-DC rectifiers, and inverters. In FVC, the frequency and voltage of the power converter are controlled in such a way that the output voltage is maintained at a desired level while the input current is limited to a predetermined value. This is achieved by adjusting the frequency and voltage of the converter based on the load conditions and the desired output voltage. When the load is light (the input supply current is less than a target limit value, the frequency and frequency of the converter can be increased for higher performance. Similarly, when the load is heavy (the input current is greater than the target limit value), the loading should be reduced to reduce the input current. As the loading is express as a function of voltage and frequency, the voltage and frequency need to be reduced to reduce the load. FVC is an effective technique for maintaining input current limits because it provides a dynamic response to load changes. By adjusting the frequency and voltage of the converter in real time, FVC can quickly respond to changes in load conditions and limit the input current to the desired level. FVC can also be used in conjunction with other voltage regulation techniques, such as feedback control, to further improve the performance of the voltage regulator.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
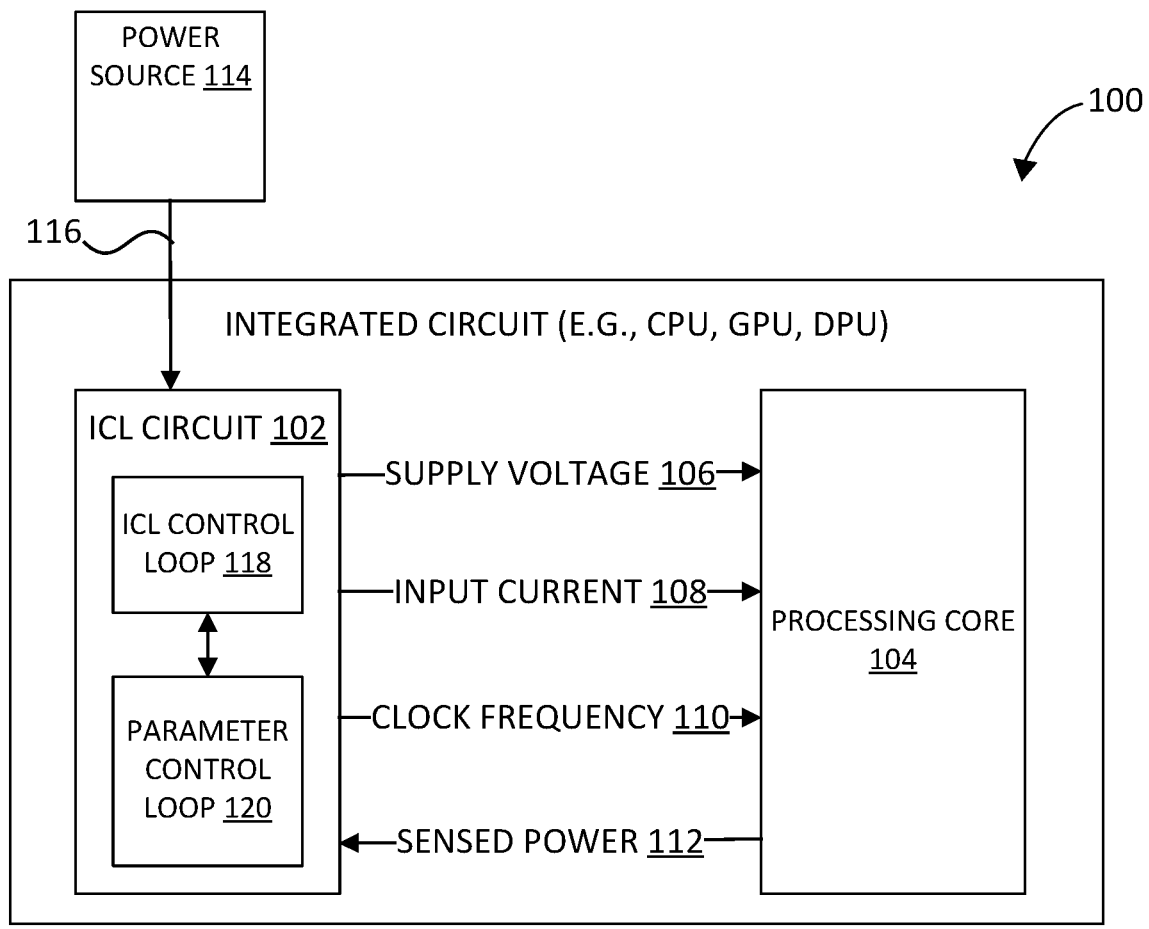
FIG. 1 is a block diagram of an integrated circuit with an input current limiter (ICL) circuit with a parameter control loop to control power of a processing core according to at least one embodiment.

As described above, FVC can be used to maintain input current limits based on load changes by adjusting the frequency and the voltage. For example, a processing core can be idle and then transition to a heavy load, which causes a current surge as most of the transistors of the processing core are switching at a maximum frequency on. An input current limiter (ICL) circuit can be used to control a rail voltage and a clock frequency in response to the increase in input current. The ICL circuit can include a voltage regulator (VR) that lowers the voltage to prevent the spike in current from exceeding the current limit corresponding to a power limit.

Conventionally, an ICL control loop can be used to control a supply voltage of the load (e.g., voltage drain to drain (VDD)) and a clock frequency of the load. The VDD is a voltage reference for the rail voltage in electronic circuits, especially digital circuits, where it is used to power the transistors or other active components of the circuit. VDD is commonly used in Complementary Metal-Oxide-Semiconductor (CMOS) digital circuits, which are widely used in microprocessors, a central processing unit (CPU), a graphics processing unit (GPU), or other processing cores, memory chips, or other digital devices. VDD represents the positive rail voltage that powers the circuit in these circuits. Other voltage references can be used, such as voltage source to source, which represents the negative rail voltage. VDD can also be referred to as a rail voltage.

In the conventional control loops, the control loop directly adjusts the supply voltage (VDD) using a power voltage regulator (VR) block, which causes a frequency-locked loop (FLL) block to adjust the clock frequency in response to the adjustment to the supply voltage. Different products, e.g., different GPU models, use different VR block solutions. ATX is a standard for computer power supplies and motherboards. The ATX standard specifies the physical dimensions, electrical requirements, and interface connectors for power supplies and motherboards used in desktop computers. The standard defines the size, shape, and placement of the power supply, as well as the voltage and current requirements for the different components of the motherboard and peripherals. Many different companies produce power supplies and motherboards that are compliant with the ATX standard. The differences in the VR solutions between these ATX providers affect ICL performance differently. Some power supply units (PSU) can introduce ringing in the ICL response, and different voltage regulators on a device (e.g., on a GPU) can affect the ICL ring behavior. Conventionally, the VR solutions use a fixed value for an input current setting register. The input current setting register can be set when testing a device coupled to a particular ATX power supply. A conventional tuning method aims to keep ICL stability by reducing the ICL reaction speed to cover corner cases, such as a worst-case ATX power supply and VR solution. However, using the fixed value that accommodates corner cases can result in larger current spikes on nominal cases due to the potentially slower ICL reaction speed according to the fixed ICL setting. Also, due to the variety of ATX power supplies, the same device can fail the ATX specification when used with another ATX power supply. Testing a device for every type of ATX power supply in the market is challenging, time-consuming, and expensive.

Aspects and embodiments of the present disclosure overcome the deficiencies described above and others by providing a control loop to fine-tune an ICL setting value for the input current setting register. For example, this ICL setting value can be fine-tuned after the device is installed in a customer's system with an ATX power supply connected. The aspects and embodiments of the present disclosure can adaptively change ICL settings to achieve the best performance for each device in each of the different settings of different ATX power supplies. The aspects and embodiments of the present disclosure can include an ICL control loop with a proportional-integral-derivative controller (PID) control block and a feedback loop in which sensed input current is fed back to the PID control block. A parallel current waveform observer can use the sensed input current to score a corresponding input current waveform in an external closed loop to fine-tune the PID parameter values dynamically based on the observer. The parallel current waveform observer can evaluate the input current waveform to determine a current peak value (less is better), a duration time of an overshoot in the peak waveform (less is better), and a ring count representing a number of peaks in the input current waveform (less is better). The ring count for peaks beyond a target time can represent a stability condition. The PID parameter values for the default ICL setting can be fine-tuned based on a standard transient test where an auto shmoo operation on the "P," "I," and "D" parameters are performed in order to select a better value that can reduce the current peak value, the duration time, and/or ring count, as compared to the default ICL setting. The ICL setting value can be fine-tuned for each end user. Each circuit board can get the best input current peak performance based on its ATX solution. And different controllers or VR solutions can use different ICL settings after adaptive ICL control settings are adjusted.

FIG. 1 is a block diagram of an integrated circuit 100 with an ICL circuit 102 with a parameter control loop 120 to control power of a processing core 104 according to at least one embodiment. The integrated circuit 100 is coupled to a power source 114. The power source 114 can provide input power 116 to the integrated circuit 100. The processing core 104 can be a processor core of a central processing unit (CPU), a core of a graphics processing unit (GPU), a core of a data processing unit (DPU), or the like. The integrated circuit 100 includes an ICL circuit 102 that can control the power delivery to the processing core 104 using an ICL control loop 118 and a parameter control loop 120. The ICL circuit 102 is coupled to the processing core 104 and can provide a supply voltage 106 (e.g., rail voltage), an input current 108, and a clock frequency 110. The ICL circuit 102, using the ICL control loop 118, can adjust a clock frequency of the processing core 104 and a supply voltage 106 based on sensed power 112 (e.g., reflecting changes to an input current 108). The ICL control loop 118 can use voltage-frequency (VF) curve data and a voltage regulator (VR) block. Additional details of the ICL control loop 118 are described in more detail below.

Unlike conventional systems that use a fixed value for an ICL setting value, the ICL circuit 102 uses the parameter control loop 120 to dynamically fine-tune an ICL setting value. The ICL setting value can be fined tuned once coupled to the specific power source 114. The parameter control loop 120 can adaptively change an ICL setting from a default value to a second value with better ICL performance than the default value. The ICL control loop 118 can include a proportional-integral-derivative controller (PID) control block and a feedback loop in which sensed input current is fed back to the PID control block. The parameter control loop 120 can be an external loop that observes a current waveform in parallel to the ICL control loop 118 and fine-tunes the ICL setting (also referred to as ICL PID value) based on the observation of the current waveform. The parameter control loop 120 can use the sensed input current to score a corresponding input current waveform in an external closed loop to fine-tune the PID parameter values dynamically based on the observations. In at least one embodiment, the parameter control loop 120 can evaluate the input current waveform to determine a current peak value (less is better), a duration time of an overshoot in the peak waveform (less is better), and a ring count representing a number of peaks (spikes) in the input current waveform (less is better). In at least one embodiment, the ICL setting is a vector value that has a value for each of the PID parameters. The PID parameter values for the default ICL setting can be fine-tuned based on a standard transient test where an auto shmoo operation on the "P," "I," and "D" parameters are performed in order to select a better value that can reduce the current peak value, the duration time, and/or ring count, as compared to the default ICL setting. In general, the term "shmoo" is a graphical representation of the input/output characteristics of a device, showing how different combinations of input signals affect the output. An auto shmoo operation is an automated testing process that involves applying a range of input signals to a device under test (DUT) and measuring the resulting output. In the auto shmoo operation, the PID parameters can be varied over a wide range of values, and the measurements are recorded to create observation data. The parameter control loop 120 does not necessarily generate a graphical representation of the input/output characteristics of the device, the generated data can be used to evaluate various characteristics of the ICL response as if a human observed these characteristics in a graphical representation. The resulting data can be analyzed to identify which PID parameters result in the best ICL performance.

In at least one embodiment, the ICL circuit 102 has a first input current setting to limit an input current signal (e.g., input current 108) provided to the processing core 104 to the current limit. The ICL control loop 118 can control the input current signal to be less than the current limit. The parameter control loop 120 can receive digital signals from the ICL circuit with the first input current setting in response to one or more transient response tests. The parameter control loop 120 can determine, using the digital samples, a response characteristic of a transient response of the input current signal. The parameter control loop 120 can adjust the first input current setting to a second input current setting until the response characteristic satisfies a condition. In at least one embodiment, the response characteristic includes at least one of a number of peaks of the input current signal, an amount of overshoot in the input current signal, or a setup time of the input current signal. An example of an input current signal is illustrated and described below with respect to FIG. 3.

In at least one embodiment, the ICL control loop 118 includes a PID control block. In at least one embodiment, the first input current setting includes a proportional gain parameter (P parameter), an integral gain parameter (I parameter), and a derivative gain parameter (D parameter). The parameter control loop 120 can adjust the first input current setting to the second input current setting until the response characteristic satisfies the condition by varying different combinations of the proportional gain parameter, the integral gain parameter, and the derivative gain parameter over the one or more transient response tests.

In at least one embodiment, the condition specifies a maximum number of peaks. The parameter control loop 120 can determine that a first number of peaks of the input current signal is greater than the maximum number of peaks in response to a first transient response test. The parameter control loop 120 can determine that a second number of peaks of the input current signal is equal to or less than the maximum number of peaks in response to a second transient response test. The PID parameters used during the second transient response test can be used for the second input current setting.

In another embodiment, the condition specifies an overshoot threshold and a setup time threshold. In response to the first transient response test or the second transient response test, the parameter control loop 120 can determine that (i) a first amount of overshoot of the input current signal is greater than the overshoot threshold, or (ii) a first amount of setup time of the input current signal is greater than the setup time threshold. In response to a third transient response test, the parameter control loop 120 can determine that (i) a second amount of overshoot of the input current signal is equal to or less than the overshoot threshold, and (ii) a second amount of setup time of the input current signal is equal to or less than the setup time threshold. PID parameters used during the second transient response test can be used for the second input current setting.

In at least one embodiment, the parameter control loop 120 can determine that the response characteristic satisfies the condition responsive to the input current signal satisfying a first threshold representing a maximum number of peaks, a second threshold representing a maximum amount of overshoot, and a third threshold representing a maximum setup time. PID parameters that satisfy the thresholds can be used for the second input current setting. Alternatively, other conditions can be used to select the PID parameters for the second input current setting.

In at least one embodiment, the ICL circuit 102 includes a VR bloc, an analog-to-digital converter (ADC), a PID control block, and a frequency-locked loop (FLL) block. The VR block can determine a voltage for the supply voltage 106 provided to the processing core 104. The ADC can convert the input current signal to a digital signal. The parameter control loop 120 can receive a copy of the digital signal. The PID control block can control the VR block based on at least the digital signal and the first value. The input current setting includes a proportional gain parameter, an integral gain parameter, and a derivative gain parameter. The FLL block can be coupled to the VR block. The FLL block can determine a frequency for clock frequency 110 provided to the processing core 104.

Figure 2:
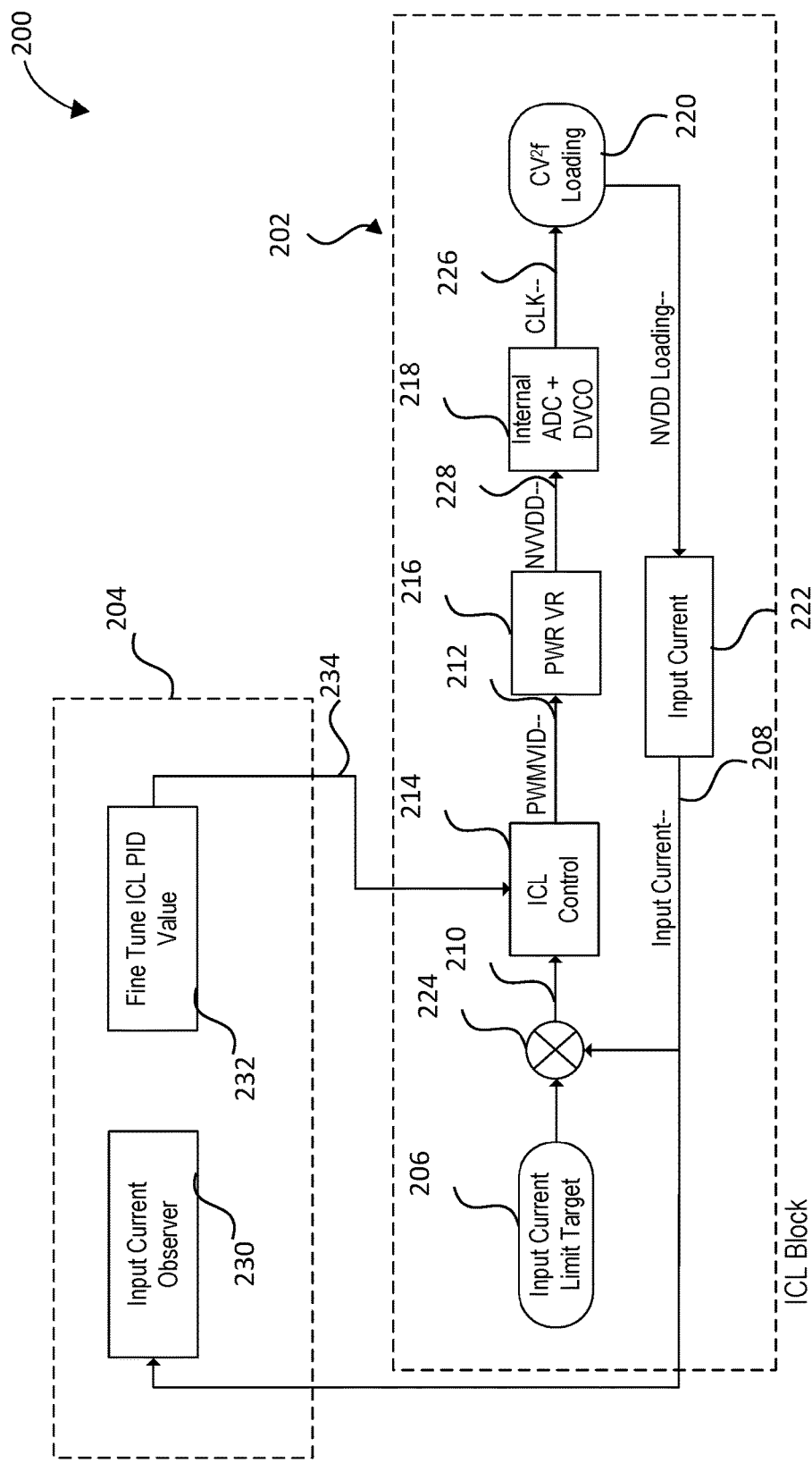
FIG. 2 is a block diagram of an integrated circuit with an ICL circuit and an observer circuit according to at least one embodiment.

FIG. 2 is a block diagram of an integrated circuit 200 with an ICL circuit 202 and an observer circuit 204 according to at least one embodiment. The ICL circuit 202 can include an ICL control loop that performs operations using one or more logic blocks to control the voltage and frequency of a processing device for core load that can be expressed as $CV^2F$, where C is the capacitance, V is the input voltage, which is squared, and f is the clock frequency. One or more logic blocks include an ICL control block 214, a power VR block 216, an internal ADC and DVCO block 218, and a current sensing block 222. The internal ADC and DVCO block 218 can measure the noise or disturbance and adjust to compensate for the noise. In at least one embodiment, the FLL can be noise aware using the ICL control block 214 described below. Alternatively, the FLL can use a state-space controller, a neural network, or the like to compensate for noise. The main advantage of using the internal ADC and DVCO block 218 is that it can improve the performance of the ICL circuit. This is particularly important in applications where the ICL circuit operates in a noisy environment, or load conditions are variable and unpredictable. In other embodiments, an FLL can be used instead of a noise-aware frequency-locked loop (NAFLL).

The ICL circuit 202 can have a target value 206, corresponding to the current limit of a processing core. The processing core can be a GPU core, a CPU core, a core of a data processing unit (DPU), or another circuit with a load that needs to be current limited to the target value 206. Using the current sensing block 222, the ICL circuit 202 can measure a current value 208 corresponding to an input current measured at the processing core. The ICL circuit 202 can determine a first offset value 210 corresponding to a first difference between the target value 206 and the current value 208. For example, a subtraction block 224 can determine an error between target value 206 and current value 208 and output the error as the first offset value 210 to the ICL control block 214. In at least one embodiment, an error amplifier can compare the target value 206 and the actual current value 208 and generate an error signal that is used to adjust the frequency and voltage by the ICL circuit 202. The ICL circuit 202 can process the feedback signals from the voltage and current sensors and the error signal to adjust the frequency and voltage as described herein. In at least one embodiment, the ICL control block 214 can be used to determine how to adjust the voltage, followed by the frequency. The ICL control block 214 can operate with a default PID setting or a first input current setting. In at least one embodiment, an oscillator can be used to generate a periodic waveform with a frequency that is proportional to the desired output frequency. In at least one embodiment, a pulse width modulation (PWM) generator can be used to generate a modulated signal that is used to control the frequency and the voltage response to the load conditions. By using FVC techniques described herein, the ICL circuit 202, including the voltage regulator (VR) block, can adjust to changes in the load and maintain a stable output voltage while limiting the input current to the processing core.

In at least one embodiment, the ICL control block 214 can use the first offset value 210 to determine a voltage identifier 212. The voltage identifier 212 can be an output of a PWM. The power VR block 216 can use the voltage identifier 212 to output a supply voltage 228 to the processing core. The internal ADC and DVCO block 218 can sense the supply voltage 228 to determine a clock frequency identifier 226. The internal ADC and DVCO block 218 can use voltage-frequency (VF) curve data to determine the clock frequency identifier 226 corresponding to the sensed supply voltage 228. In another embodiment, the internal ADC and DVCO block 218 can include a V-F curve block that determines the clock frequency identifier 226 from the sensed supply voltage 228 using a look-up table (LUT). The $CV^2F$ loading block 220 is not logic or a circuit, but represents the supply voltage 228, the supply current, and the clock corresponding to the clock frequency identifier 226 being provided to the processing core. The current sensing block 222 can sense the input current (e.g., current value 208) of the processing core and other loading metrics of the processing core. In this manner, the ICL circuit 202 changes the frequency and voltage appropriately based on the sensed input current at $CV^2F$ loading block 220. Although the ICL circuit 202 adjusts voltage first in this control loop, in other embodiments, the ICL circuit can adjust frequency first.

In at least one embodiment, the ICL control block 214 can use a PID controller with a feedback control mechanism to regulate a system's output based on its error or deviation from the desired setpoint. The controller uses three parameters: Kp, Ki, and Kd, to compute the output control signal. The proportional component (Kp) is proportional to the current error and determines the proportion of the error that should be corrected by the output. A higher Kp value will result in a more aggressive response to the error. The integral component (Ki) considers the accumulated error over time and determines the degree of correction that needs to be applied over time. The integral component allows the system to eliminate any steady-state error, which is the error that persists even when the system reaches a steady state. The derivative component (Kd) considers the rate of change of the error and is used to reduce the overshoot and oscillation in the system. The derivative component helps to anticipate and dampen any sudden changes in the system output. The PID controller computes the output control signal as the sum of the proportional, integral, and derivative components. The equation for the PID control is as follows:

Output=$Kp$error+$Ki$integral(error)+$Kd$*derivative(error), where, error=Setpoint−Actual Value integral(error)=summation of error over time derivative(error)=rate of change of error over time.

The following table defines some of the variables and parameters the PID controller uses.

| | |
|---|---|
| u(t)= | PID control variable |
| $K_p$= | proportional gain |
| e(t)= | error value |
| $K_i$= | integral gain |
| de= | change in error value |
| dt= | change in time |

The PID controller continuously monitors the system output and adjusts the output control signal based on the error feedback until the system output reaches the desired setpoint. As described herein, the PID controller can have a set of default values for the three parameters. The observer circuit 204 can be used to adjust the set of default values to values that improve the ICL performance, as described herein.

The observer circuit 204 can receive a copy of the current value 208 from the ICL circuit 202. The observer circuit 204 can include observation logic 230 and tuning logic 232. The observation logic 230 can receive digital samples from the ICL circuit 202 with a default or first input current setting in response to one or more transient response tests being performed. The observation logic 230 can determine, using the digital samples, a response characteristic of a transient response of the input current signal, as reflected in the digital samples of the current value 208 used by the ICL circuit 202.

The tuning logic 232 can adjust the first input current setting to a second input current setting 234 until the response characteristic satisfies a condition. The second input current setting is a second PID setting different from the default PID setting or the first input current setting. In at least one embodiment, the response characteristic can be used to adjust one or more of a proportional gain parameter, an integral gain parameter, or a derivative gain parameter of the ICL control block 214. In at least one embodiment, the observer circuit 204 can determine that the response characteristic satisfies the condition responsive to the input current signal satisfying a first threshold representing a maximum number of peaks, a second threshold representing a maximum amount of overshoot, and a third threshold representing a maximum setup time. The observer circuit 204 can adjust the first input current setting to the second input current setting until the response characteristic satisfies the condition by varying different combinations of the proportional gain parameter, the integral gain parameter, and the derivative gain parameter over the one or more transient response tests. In at least one embodiment, the response characteristic can include a number of peaks of the input current signal, an amount of overshoot in the input current signal, or a setup time of the input current signal, as illustrated and described below with respect to FIG. 3.

Figure 3:
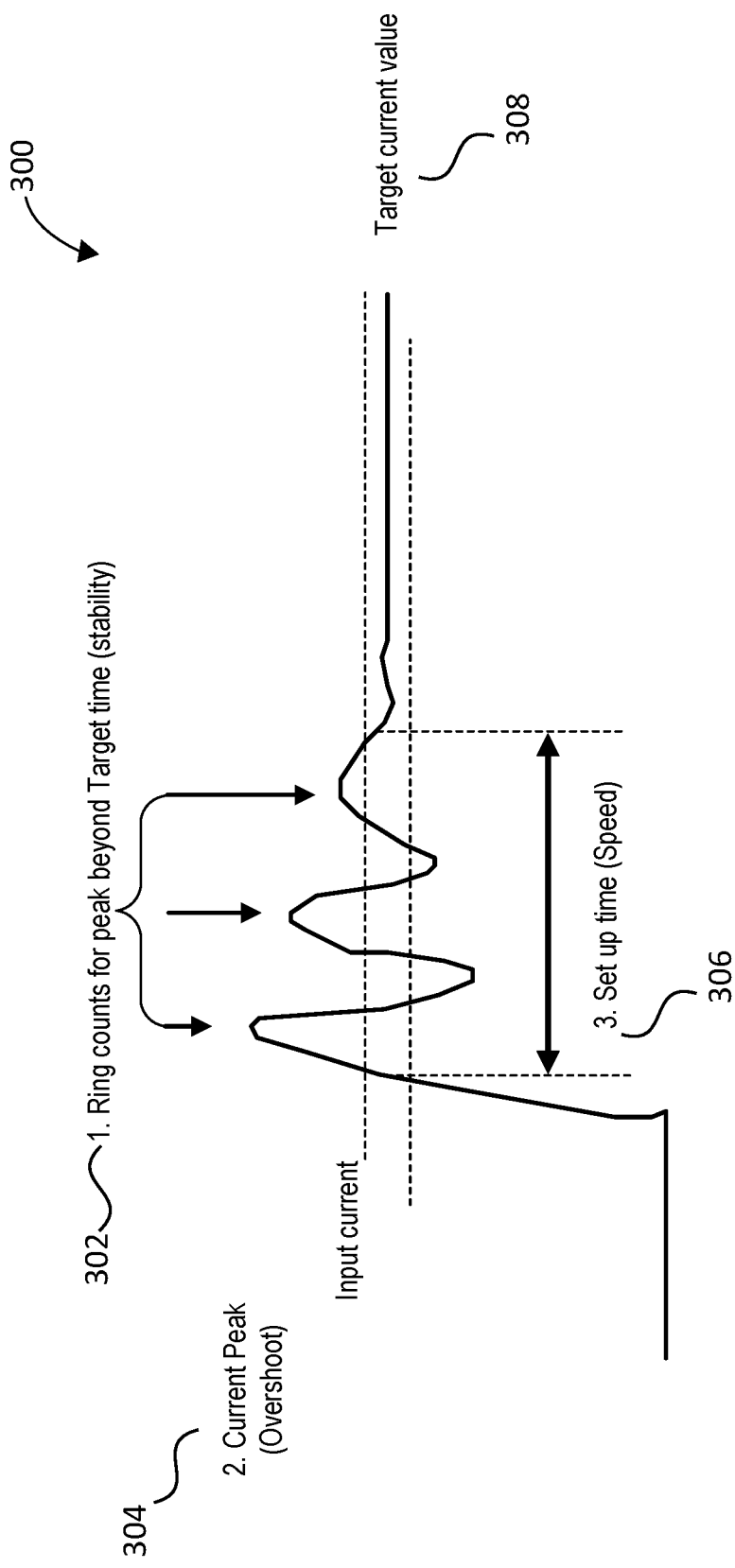
FIG. 3 illustrates an input current signal according to at least one embodiment.

FIG. 3 illustrates an input current signal 300 according to at least one embodiment. The input current signal 300 can be a graphical representation of the digital samples of the current value 208 received from the ICL circuit 202. The input current signal 300 includes one or more response characteristics, including a ring count 302, a current peak 304, and a setup time 306. The ring count 302 represents a number of peaks in the input current signal 300. The current peak 304 represents a magnitude of a maximum peak of the number of peaks in the input current signal 300. The setup time 306 represents an amount of setup time for the input current signal 300 to reach a target current value 308. In at least one embodiment, the condition can specify a maximum number of peaks. The observer circuit 204 can determine that a first number of peaks of the input current signal 300 is greater than the maximum number of peaks in response to a first transient response test. In a subsequent test, e.g., a second transient response test, the observer circuit 204 can determine that a second number of peaks of the input current signal is equal to or less than the maximum number of peaks. The condition can be satisfied in the second transient response. During the second transient response test, the PID parameters can be different than the default PID parameters. In another embodiment, the condition can specify an overshoot threshold. In another embodiment, the condition can specify a setup time threshold. In another embodiment, the condition can specify any combination of the three thresholds.

In at least one embodiment, in response to the first transient response test or the second transient response test, the observer circuit 204 can determine that (i) a first amount of overshoot of the input current signal 300 is greater than the overshoot threshold, or (ii) a first amount of setup time of the input current signal 300 is greater than the setup time threshold. In at least one embodiment, in response to a third transient response test, the observer circuit 204 can determine that (i) a second amount of overshoot of the input current signal is equal to or less than the overshoot threshold, and (ii) a second amount of setup time of the input current signal is equal to or less than the setup time threshold. The corresponding PID parameters for the third transient response test can be used for the second input current setting 234.

In at least one embodiment, the integrated circuit 200 can use a standard transient test as a software load and engage the observer circuit 204 to perform a shmoo operation on the PID parameter values for a better input current setting. For example, the PID parameter value can be probed to observe conditions of stability and reaction speed of the input current signal 300. In at least one embodiment, the observer circuit 204 can prioritize the conditions as follows: stability (ring count 302)>overshoot (current peak 304)>speed (setup time 306). In at least one embodiment, based on the PID parameter values observed by observation logic 230, the tuning logic 232 can fine-tune the PID setting from the default setting (e.g., a default factor setting) to a second setting. In at least one embodiment, the observer circuit 204 can obtain a stability condition (e.g., ring count being less than or equal to two) as a first rule and then perform shmoo operations on the three parameter values for less overshoot and faster speeds. For example, the current peak should be less than or equal to 1.8 times the total power over the supply voltage (e.g., 1.8×TotalGraphicpower/Vin). For example, the setup time 306 can be less than or equal to 400 microseconds for timing requirements. Alternatively, other conditions can be defined for the response characteristic of the input current signal 300. For example, the current peak can alternatively be less than or equal to 1.2 or 1.5 times the total power over the supply voltage (e.g., 1.2× or 1.5×TotalGraphicpower/Vin).

In at least one embodiment, the observer circuit 204 can adjust Kp, Ki, and Ka, where Kr is the proportional gain, a first tuning parameter, Ki is the integral gain, a second tuning parameter, and KD is the derivative gain, a third tuning parameter of the ICL control block 214, as described herein.

Figure 4A:
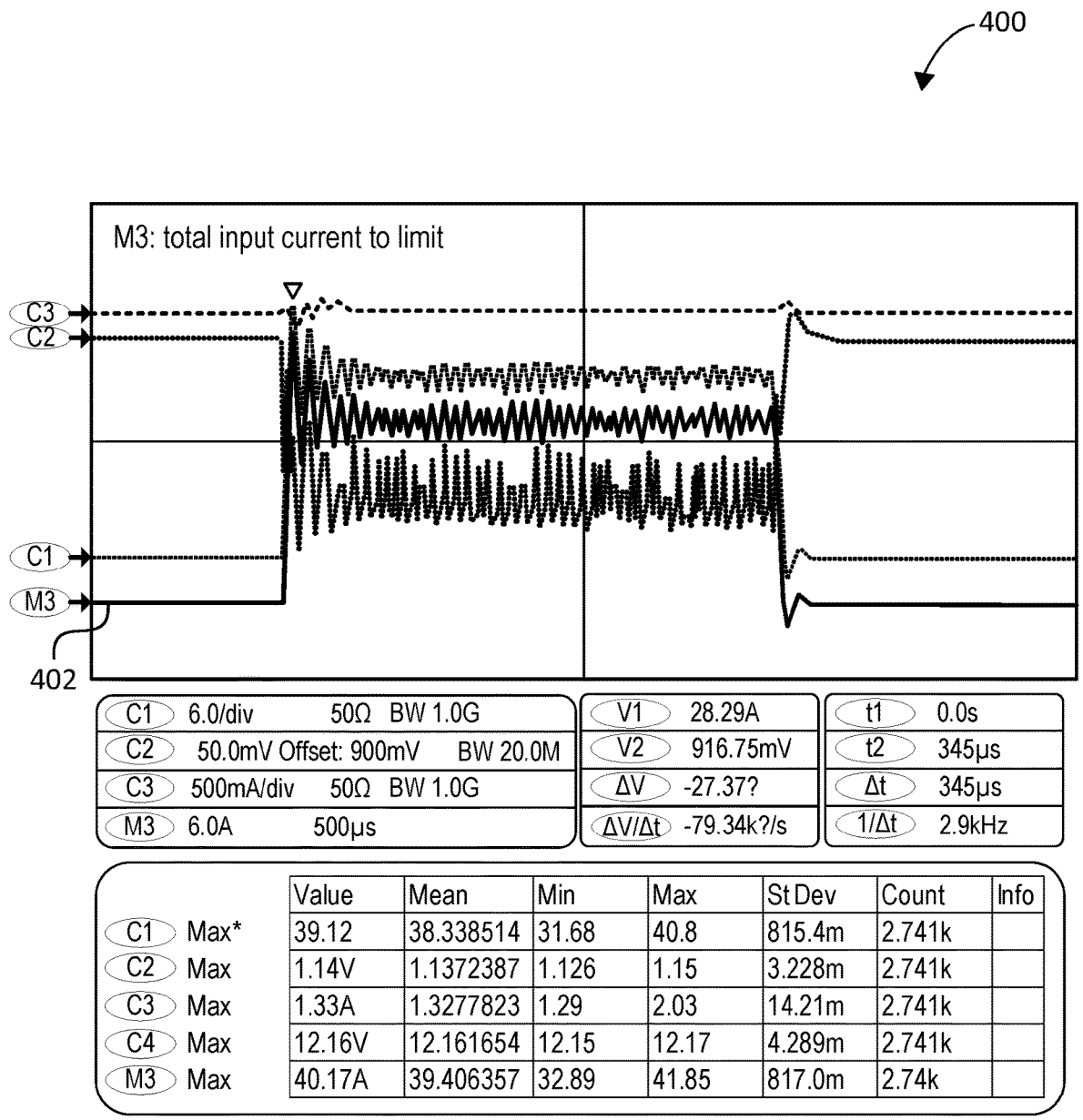
FIG. 4A is a graph illustrating an input current signal having a ring count greater than two using a default input current setting according to at least one embodiment.
Figure 4B:
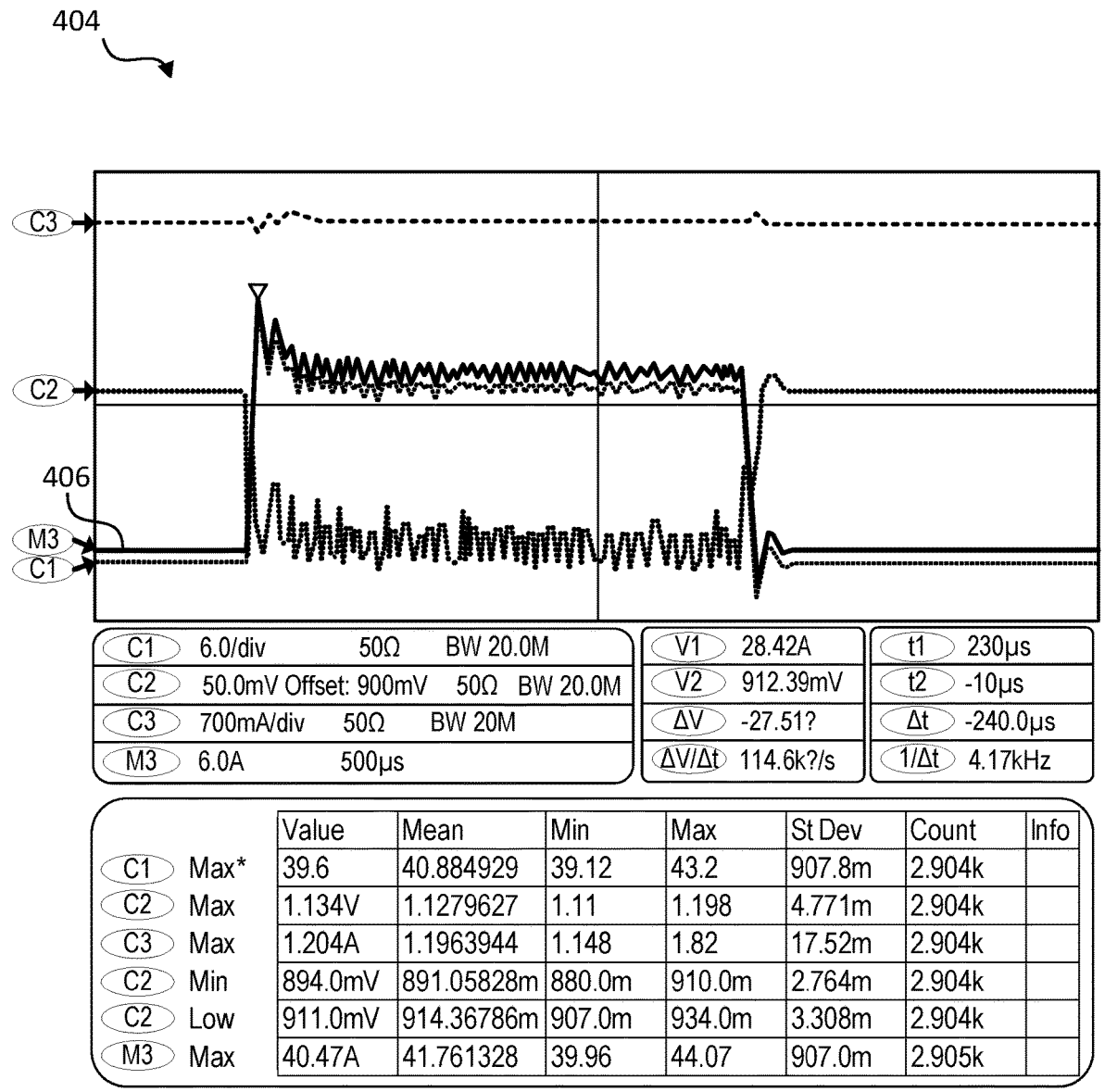
FIG. 4B is a graph illustrating an input current signal having a ring count equal to or less than two using adjusted PI parameters of a second input current setting according to at least one embodiment.

In at least one embodiment, the observer circuit 204 can perform one or more transient response tests in a two-stage algorithm. In a first stage, the observer circuit 204 can fine-tune the "P" and "I" parameters of the PID control block to satisfy a stability condition (e.g., a ring count of less than or equal to two). In a second stage, the observer circuit 204 can fine-tune the "D" parameter of the PID control block to satisfy a peak value condition (e.g., peak value less than a specified threshold). In this embodiment, the stability condition has the highest priority. The stability condition can specify a target overshoot ring being less than or equal to two (e.g., target overshoot ring<=2). To reduce the ring count in the input current signal, the observer circuit 204 can initially reduce the "P" parameter value and the "I" parameter value to obtain stability in the input current signal. For example, the observer circuit 204 can fine-tune the "P" parameter value to 66% of the default "P" value, and the "I" parameter value to 66% of the default "I" value, which results in the ring count going from a condition where the ring count is greater than two when using the default values, as illustrated in FIG. 4A, to a condition where the ring count is equal to or less than two, as illustrated in FIG. 4B. In this example, the current peak value and the setup time (also referred to as response time) are still within product specifications.

FIG. 4A is a graph 400 illustrating an input current signal 402 having a ring count greater than two using a default input current setting according to at least one embodiment.

FIG. 4B is a graph 404 illustrating an input current signal 406 having a ring count equal to or less than two using adjusted PI parameters of a second input current setting according to at least one embodiment.

Figure 4C:
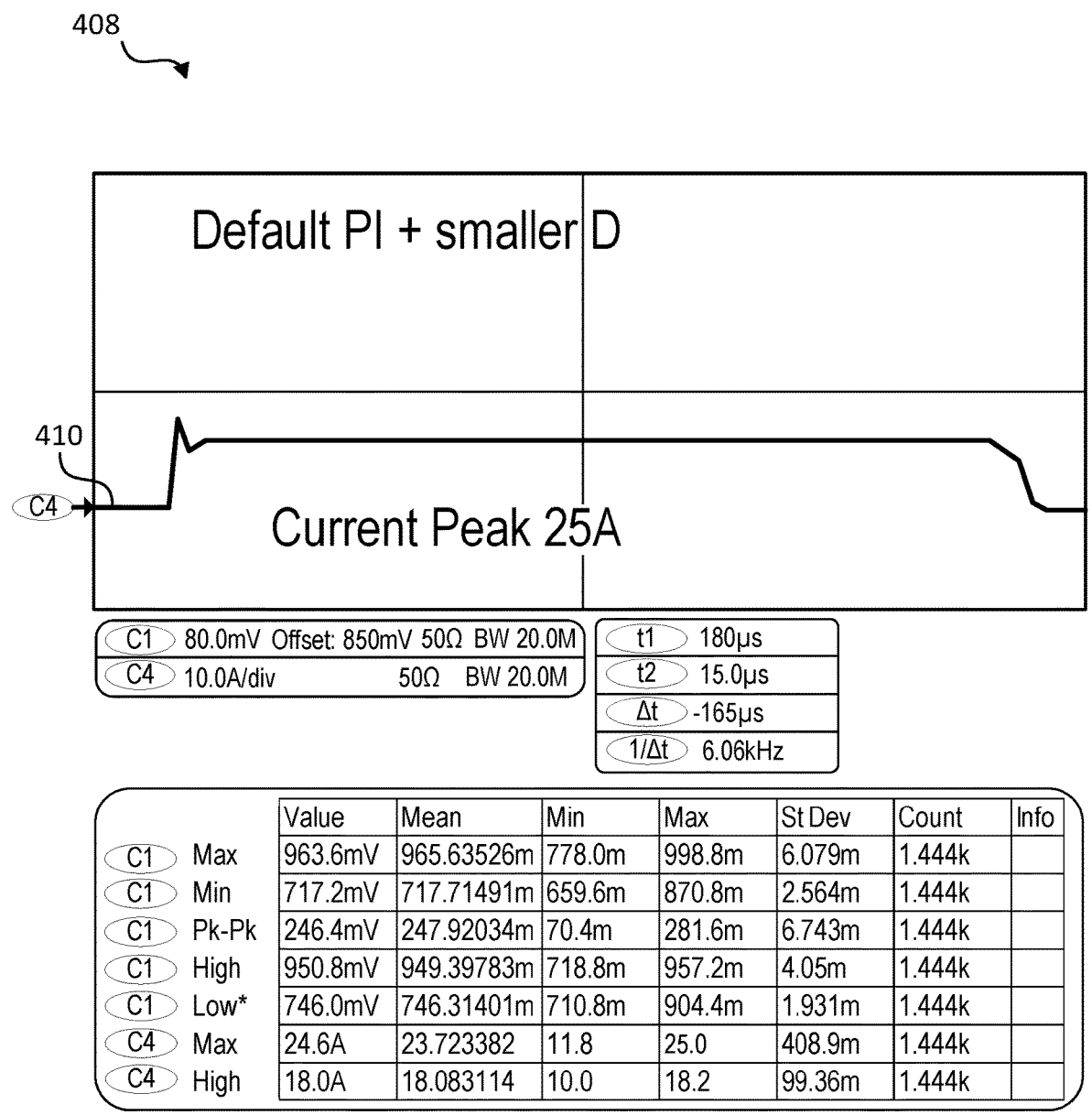
FIG. 4C is a graph illustrating an input current signal having a first current peak value using a first adjusted D parameter of the second input current setting according to at least one embodiment.
Figure 4D:
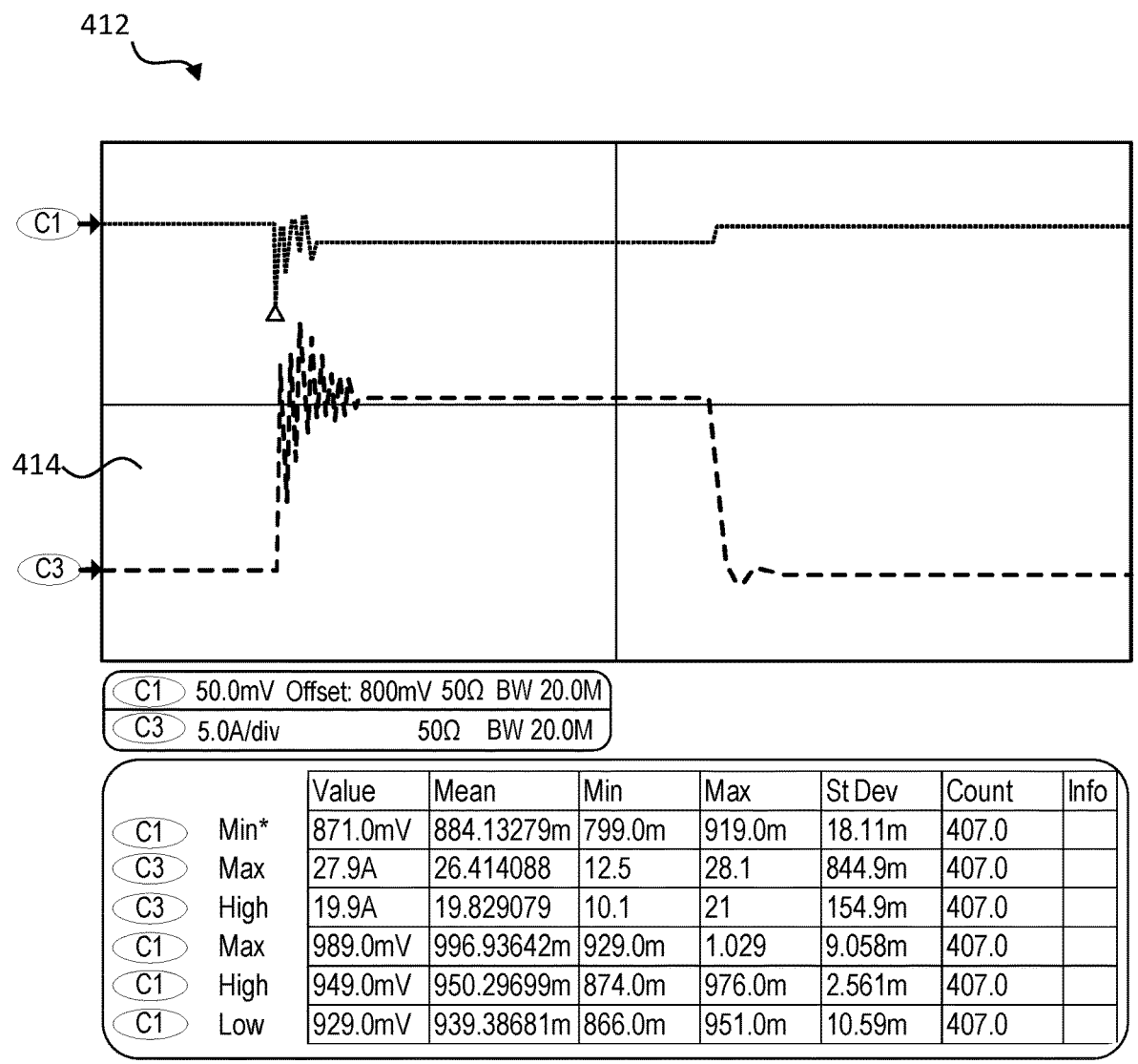
FIG. 4D is a graph illustrating an input current signal having a second current peak value using a second adjusted D parameter of the second input current setting and a ring count greater than two according to at least one embodiment.
Figure 4E:
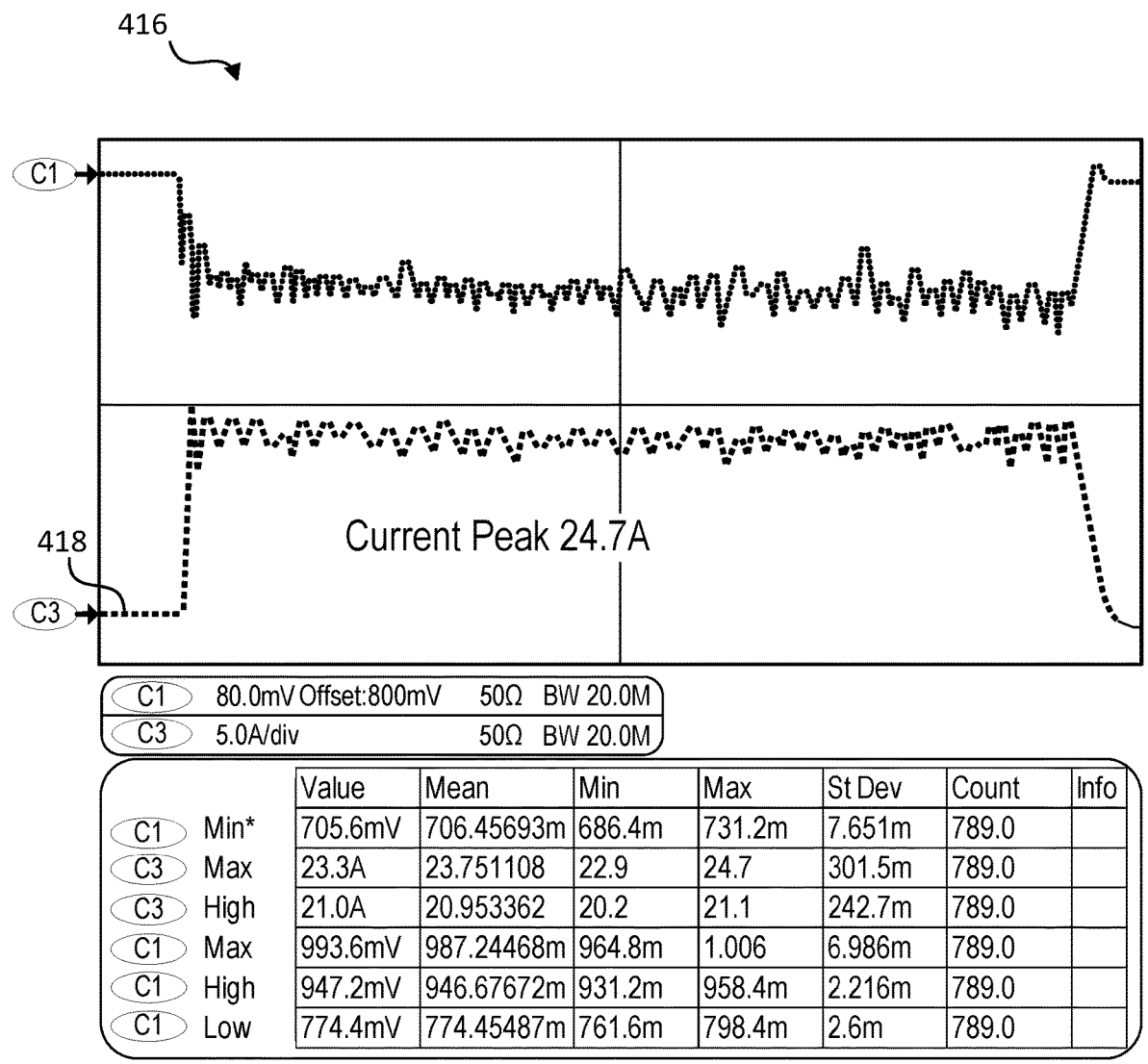
FIG. 4E is a graph illustrating an input current signal having a third current peak value using a third adjusted D parameter of the second input current setting and a ring count equal to or less than two according to at least one embodiment.

As described above, in the second stage, after the stability condition is met (e.g., ring count being equal to or less than two) by adjusting the "P" and "I" parameter values, the observer circuit 204 can fine-tune the "D" parameter of the PID control block to satisfy a peak value condition (e.g., peak value less than a specified threshold). To further reduce the current peak, based on the adjusted "P" and "I" parameter values, the observer circuit 204 needs to increase the "D" parameter value. The "D" parameter of the PID control block has a gain component and a low pass filter (LPF) component (e.g., D term=D_gain*$(1-z^{(-1)})$*LPF). A large gain can be used to reduce the current peak. A higher bandwidth of the LPF can be used for a quicker response but can have less stability. Three different "D" values are shown in FIG. 4C, FIG. 4D, and FIG. 4E. In these three examples, the "D" parameter value is increased to reduce the current peak.

FIG. 4C is a graph 408 illustrating an input current signal 410 having a first current peak value using a first adjusted D parameter of the second input current setting according to at least one embodiment. As illustrated in graph 408, the adjusted P and I parameter values are used with a first D parameter value (e.g., small D value). In this example, the current peak is 25 Amps (A)

FIG. 4D is a graph 412 illustrating an input current signal 414 having a second current peak value using a second adjusted D parameter of the second input current setting and a ring count greater than two according to at least one embodiment. As illustrated in graph 412, the adjusted P and I parameter values are used with a second D parameter value (e.g., larger D value). In this example, the current peak is less than 25 A, but the larger gain increases ring counts, resulting in instability of the input current signal.

FIG. 4E is a graph 416 illustrating an input current signal 418 having a third current peak value using a third adjusted D parameter of the second input current setting and a ring count equal to or less than two according to at least one embodiment. As illustrated in graph 416, the adjusted P and I parameter values are used with a third D parameter value (e.g., medium D value), and the LPF bandwidth is tuned. In this example, the current peak is 21.1 A, and the ring count is equal to or less than two for stability.

Figure 5:
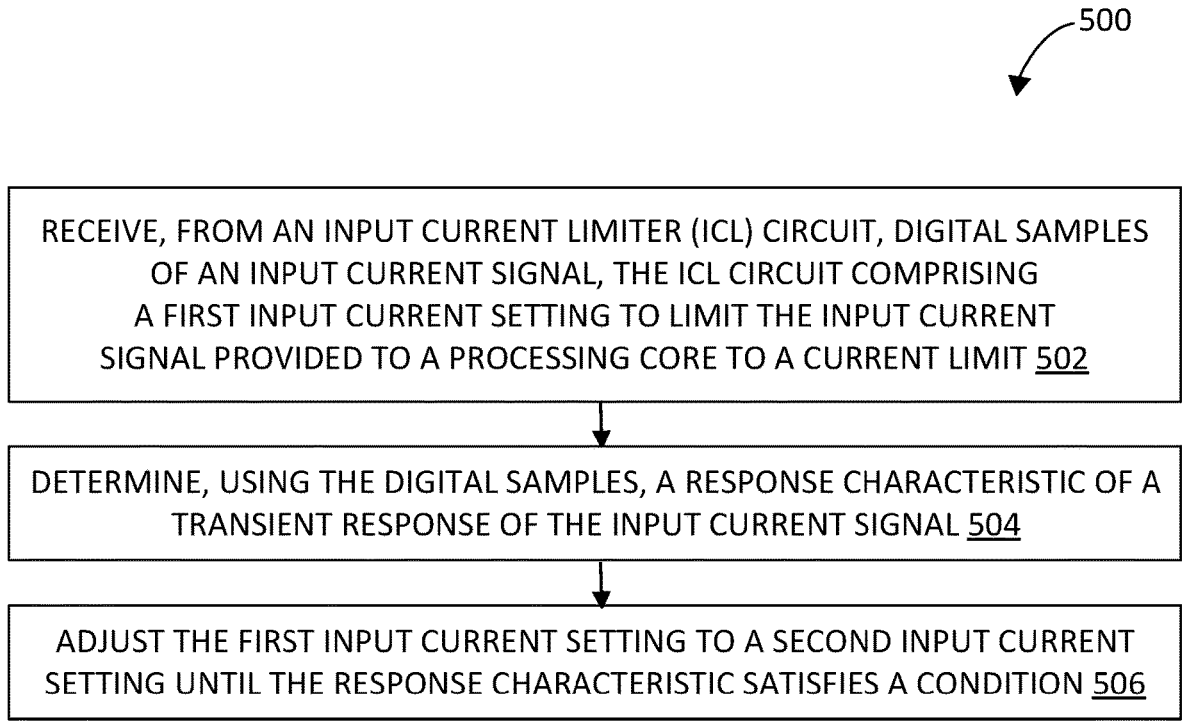
FIG. 5 is a flow diagram of a method for controlling an input current setting of an ICL circuit according to at least one embodiment.

FIG. 5 is a flow diagram of a method 500 for controlling an input current setting of an ICL circuit according to at least one embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by the integrated circuit 100 of FIG. 1. In another embodiment, the method 500 is performed by the ICL circuit 102 of FIG. 1. In another embodiment, the method 500 is performed by parameter control loop 120 of FIG. 1. In another embodiment, the method 500 is performed by integrated circuit 200 of FIG. 2. In another embodiment, the method 500 is performed by observer circuit 204 of FIG. 2. In another embodiment, the method 500 is performed by processing unit 600 of FIG. 6. In another embodiment, the method 500 is performed by circuit 604 of FIG. 6.

Referring to FIG. 5, the method 500 begins with the processing logic receiving a digital signal from an ICL circuit (block 502). The ICL circuit includes a first input current setting to limit an input current signal provided to a processing core to the current limit. At block 504, the processing logic determines, using the digital samples, a response characteristic of a transient response of the input current signal. At block 506, the processing logic adjusts the first input current setting to a second input current setting until the response characteristic satisfies a condition.

In at least one embodiment, the response characteristic comprises at least one of a number of peaks of the input current signal, an amount of overshoot in the input current signal, or a setup time of the input current signal. In at least one embodiment, the ICL circuit includes a PID control block. The first input current setting includes a proportional gain parameter, an integral gain parameter, and a derivative gain parameter. The processing logic adjusts the first input current setting to the second input current setting by varying different combinations of the proportional gain parameter, the integral gain parameter, and the derivative gain parameter over the one or more transient response tests. In at least one embodiment, the condition specifies a maximum number of peaks. The processing logic can further determine that a first number of peaks of the input current signal is greater than the maximum number of peaks in response to a first transient response test. The processing logic can determine that a second number of peaks of the input current signal is equal to or less than the maximum number of peaks in response to a second transient response test. Assuming the second number of peaks satisfies the condition, the parameter values being used can be selected for the second input current setting.

In another embodiment, the condition specifies an overshoot threshold and a setup time threshold. In response to the first transient response test or the second transient response test, the processing logic can determine that (i) a first amount of overshoot of the input current signal is greater than the overshoot threshold, or (ii) a first amount of setup time of the input current signal is greater than the setup time threshold. In response to a third transient response test, the processing logic can determine that (i) a second amount of overshoot of the input current signal is equal to or less than the overshoot threshold, and (ii) a second amount of setup time of the input current signal is equal to or less than the setup time threshold.

In at least one embodiment, the processing logic determines that the response characteristic satisfies the condition responsive to the input current signal satisfying a first threshold representing a maximum number of peaks, a second threshold representing a maximum amount of overshoot, and a third threshold representing a maximum setup time.

Figure 6:
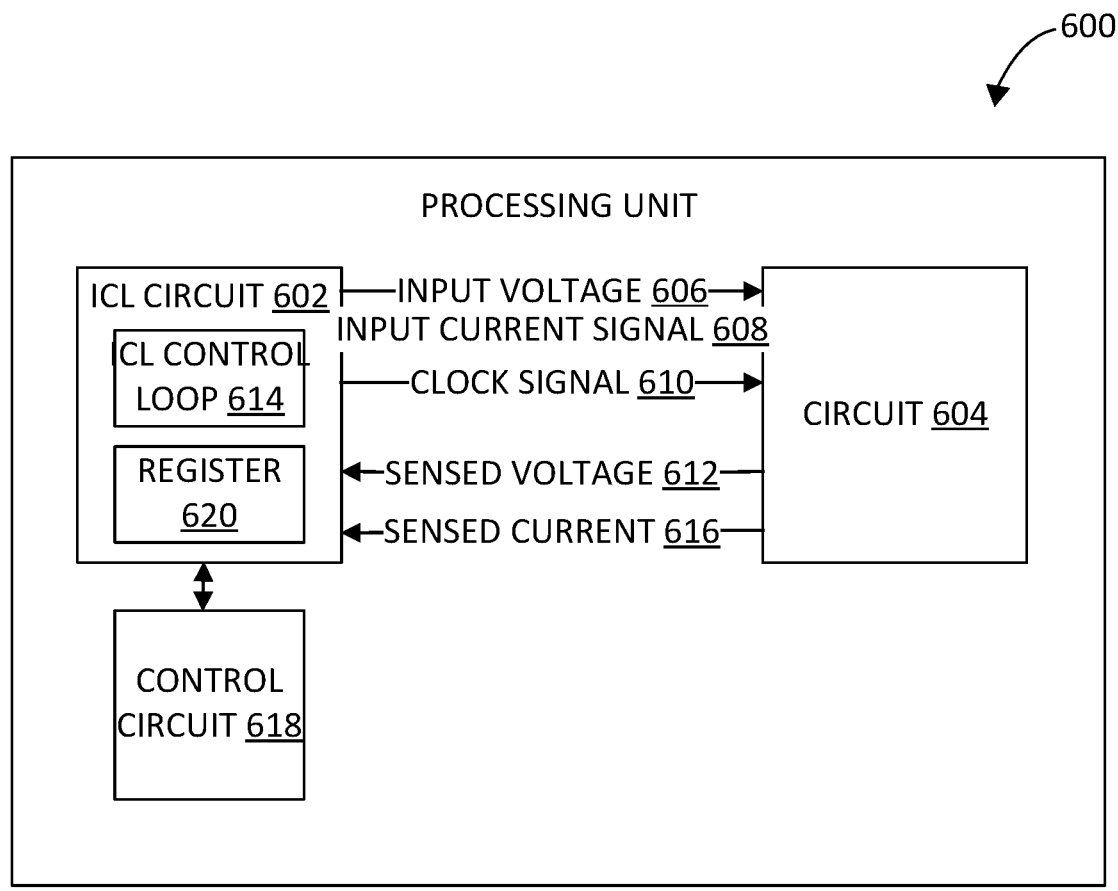
FIG. 6 is a block diagram of a processing unit with an ICL circuit and a control circuit according to at least one embodiment.

FIG. 6 is a block diagram of a processing unit 600 with an ICL circuit 602 and a control circuit 618 according to at least one embodiment. The processing unit 600 includes a circuit 604 having a current limit that is controlled by the ICL circuit 602. The ICL circuit 602 is coupled to the circuit 604. The ICL circuit 602 can limit an input current signal 608 provided to the circuit 604 to a first value representing the current limit of the circuit 604. The ICL circuit 602 can include a register 620 to store a second value corresponding to an input current setting of the ICL circuit 602. The second value can be specified as a default input current setting during manufacturing. Once the processing unit 600 is coupled to a power supply (not illustrated in FIG. 6), the control circuit 618 can adjust the second value to a new value for an adjusted input current setting for the particular environment of the processing unit 600. The control circuit 618 is coupled to the ICL circuit 602. The control circuit 618 can, in response to one or more transient response tests, determine a number of peaks of the input current signal 608.

The control circuit 618 can determine a third value representing an amount of overshoot in a first peak of the input current signal 608 above the first value (or a range associated with the first value). The control circuit 618 can determine a fourth value representing a setup time of the input current signal to settle at the first value (or the range associated with the first value). The control circuit 618 can determine a fifth value for the input current setting based at least in part on the number of peaks, the third value, and the fourth value. The control circuit 618 can store the fifth value in the register 620. The control circuit 618 can repeat the transient response test one or more times to determine the fifth value. The circuit 604 can be a processing core, a memory device, processing logic, or other circuitry that needs to be current limited by the ICL circuit 602.

The ICL circuit 602 can also provide, as an input voltage 606, a first voltage to the circuit 604 according to a first VF setting. The ICL circuit 602 can provide a change of a first frequency of a clock signal 610 to a second frequency. A change to the second frequency causes the first voltage of the first VF setting to change to a second voltage lower than the first voltage. The second voltage can be determined based on the second frequency. The ICL circuit 602 can provide, as the input current, a second amount of current to the circuit 604 according to a second VF setting. The second VF setting defines the second frequency and the second voltage. In at least one embodiment, the ICL circuit 602 can change the second frequency of the second VF setting to a third frequency. A change to the third frequency causes the input voltage to change from the second voltage to a third voltage. The ICL circuit 602 can provide, as the input current, a third input current to the circuit 604 according to a third VF setting. The third VF setting defines the third frequency and the third voltage.

In at least one embodiment, the processing unit 600 is a CPU, a GPU, a DPU, a switch, a processor, a microprocessor, a microcontroller, or the like.

The techniques disclosed herein may be incorporated in any processor that may be used for processing a neural network, such as, for example, a central processing unit (CPU), a GPU, an intelligence processing unit (IPU), a neural processing unit (NPU), tensor processing unit (TPU), a neural network processor (NNP), a data processing unit (DPU), a vision processing unit (VPU), an application-specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, a voice-controlled device, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or alter, generate, or compress an image. For example, such a processor may be employed to enhance an image that is rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device. Such transmissions may be utilized to stream image data from a server or a data center in the cloud to a user device (e.g., a personal computer, video game console, smartphone, other mobile devices, etc.) to enhance services that stream images such as NVIDIA GeForce Now (GFN), Google Stadia, and the like.

As an example, a processor incorporating the techniques disclosed herein can be employed to process one or more neural networks for any other types of applications that can take advantage of a neural network. For example, such applications may involve translating languages, identifying and negating sounds in audio, detecting anomalies or defects during the production of goods and services, surveillance of living beings and non-living things, medical diagnosis, making decisions, and the like.

Other variations are within the spirit of the present disclosure. Thus, while disclosed techniques are susceptible to various modifications and alternative constructions, certain illustrated embodiments are shown in drawings and described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if something is intervening. Recitation of ranges of values herein is merely intended to serve as a shorthand method of referring individually to each separate value falling within the range, unless otherwise indicated herein. Each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two but can be more when indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors for example, a non-transitory computer-readable storage medium store instructions and a main central processing unit ("CPU") executes some of the instructions while a graphics processing unit ("GPU") and/or a data processing unit ("DPU")—potentially in conjunction with a GPU—executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or a similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an interprocess communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An integrated circuit comprising:
   a processing core;
   an input current limiter (ICL) circuit coupled to the processing core, the processing core being a load, and the ICL circuit to control a supply voltage and an input current supplied to the processing core to improve power regulation of the processing core during a change in load conditions of the processing core, wherein the ICL circuit is to limit the input current according to a first input current limit; and
   a control circuit coupled to the ICL circuit, wherein the control circuit is to:
      receive digital samples from the ICL circuit with a first input current setting in response to one or more transient response tests with a change in the load conditions of the processing core;
      determine, using the digital samples, a response characteristic of a transient response of the input current by:
         determining a number of peaks of the input current;
         determining, in a first peak of the input current, an amount of overshoot above the first input current limit;
         determining a setup time of the input current to settle at the first input current limit; and
         determining a second input current setting based at least in part on the number of peaks, the amount of overshoot, and the setup time; and
      adjust the first input current setting to the second input current setting until the response characteristic satisfies a condition.

2. The integrated circuit of claim 1, wherein the ICL circuit comprises a proportional-integral-derivative (PID) control block, wherein the first input current setting is a default PID setting, and wherein the second input current setting is a second PID setting different from the default PID setting.

3. The integrated circuit of claim 1, wherein the ICL circuit comprises a proportional-integral-derivative (PID) control block, wherein the first input current setting comprises:
   a proportional gain parameter;

an integral gain parameter; and
a derivative gain parameter, wherein the control circuit is to adjust the first input current setting to the second input current setting until the response characteristic satisfies the condition by varying different combinations of the proportional gain parameter, the integral gain parameter, and the derivative gain parameter over the one or more transient response tests.

4. The integrated circuit of claim 1, wherein the ICL circuit comprises a proportional-integral-derivative (PID) control block, wherein the condition specifies a maximum number of peaks, wherein the control circuit is to:
determine that a first number of peaks of the input current is greater than the maximum number of peaks in response to a first transient response test; and
determine that a second number of peaks of the input current is equal to or less than the maximum number of peaks in response to a second transient response test.

5. The integrated circuit of claim 4, wherein the condition specifies an overshoot threshold and a setup time threshold, wherein the control circuit is to:
in response to the first transient response test or the second transient response test, determine that (i) a first amount of overshoot of the input current is greater than the overshoot threshold, or (ii) a first amount of setup time of the input current is greater than the setup time threshold; and
in response to a third transient response test, determine that (i) a second amount of overshoot of the input current is equal to or less than the overshoot threshold, and (ii) a second amount of setup time of the input current is equal to or less than the setup time threshold.

6. The integrated circuit of claim 1, wherein the ICL circuit comprises a proportional-integral-derivative (PID) control block, wherein the control circuit is to:
determine that the response characteristic satisfies the condition in response to the input current satisfying a first threshold representing a maximum number of peaks, a second threshold representing a maximum amount of overshoot, and a third threshold representing a maximum setup time.

7. The integrated circuit of claim 1, wherein the ICL circuit comprises:
a voltage regulator (VR) block to determine a voltage for the processing core;
an analog-to-digital converter (ADC) to convert the input current of the processing core to a digital signal, wherein the control circuit is to receive a copy of the digital signal; and
a proportional-integral-derivative (PID) control block, wherein the PID control block is to control the VR block based on at least the digital signal and the first input current setting, wherein the input current setting comprises a proportional gain parameter, an integral gain parameter, and a derivative gain parameter; and
a frequency-locked loop (FLL) block coupled to the VR block, the FLL block to determine a frequency for the processing core.

8. A method comprising:
controlling, using an input current limiter (ICL) circuit, a supply voltage and an input current being supplied to a processing core to improve power regulation of the processing core during a change in load conditions of the processing core;
receiving, at a control circuit from the ICL circuit with a first input current setting, digital samples of the input current, the ICL circuit to limit the input current according to a first input current limit;
determining, using the digital samples, a response characteristic of a transient response of the input current in response to a change in the load conditions of the processing core, wherein determining the response characteristic of the transient response comprises:
determining a number of peaks of the input current;
determining, in a first peak of the input current, an amount of overshoot above the first input current limit;
determining a setup time of the input current to settle at the first input current limit; and
determining a second input current setting based at least in part on the number of peaks, the amount of overshoot, and the setup time; and
adjust the first input current setting to the second input current setting until the response characteristic satisfies a condition.

9. The method of claim 8, wherein the ICL circuit comprises a proportional-integral-derivative (PID) control block, wherein the first input current setting comprises a proportional gain parameter, an integral gain parameter, and a derivative gain parameter, wherein adjusting the first input current setting to the second input current setting comprises varying different combinations of the proportional gain parameter, the integral gain parameter, and the derivative gain parameter over one or more transient response tests.

10. The method of claim 8, wherein the ICL circuit comprises a proportional-integral-derivative (PID) control block, wherein the condition specifies a maximum number of peaks, wherein the method further comprises:
determining that a first number of peaks of the input current is greater than the maximum number of peaks in response to a first transient response test; and
determining that a second number of peaks of the input current is equal to or less than the maximum number of peaks in response to a second transient response test.

11. The method of claim 8, wherein the condition specifies an overshoot threshold and a setup time threshold, wherein the method further comprises:
in response to a first transient response test or a second transient response test, determining that (i) a first amount of overshoot in the input current is greater than the overshoot threshold, or (ii) a first amount of setup time for the input current is greater than the setup time threshold; and
in response to a third transient response test, determining that (i) a second amount of overshoot in the input current is equal to or less than the overshoot threshold, and (ii) a second amount of setup time for the input current is equal to or less than the setup time threshold.

12. The method of claim 8, wherein the ICL circuit comprises a proportional-integral-derivative (PID) control block, wherein the method further comprises:
determining that the response characteristic satisfies the condition in response to the input current satisfying a first threshold representing a maximum number of peaks, a second threshold representing a maximum amount of overshoot, and a third threshold representing a maximum setup time.

13. A processing unit comprising:
a circuit comprising a current limit; and
an input current limiter (ICL) circuit coupled to the circuit, the ICL circuit to control a supply voltage and an input current supplied to the circuit to improve power regulation of the circuit during a change in load conditions of the circuit, wherein the ICL circuit is to limit the input current according to a first value representing the current limit, wherein the ICL circuit comprises a register to store a second value for an input current setting of the ICL circuit; and a control circuit coupled to the ICL circuit, wherein the control circuit is to, in response to a transient response test:
- determine a number of peaks of the input current;
- determine a third value representing an amount of overshoot in a first peak of the input current above the first value;
- determine a fourth value representing a setup time of the input current to settle at the first value;
- determine the second value for the input current setting based at least in part on the number of peaks, the third value, and the fourth value; and
- store the second value in the register.

14. The processing unit of claim 13, wherein the ICL circuit comprises:
a proportional-integral-derivative (PID) control block to control a voltage and a frequency for the circuit according to the input current setting, wherein the input current setting is a PID setting comprising a proportional gain parameter, an integral gain parameter, and a derivative gain parameter.

15. The processing unit of claim 13, wherein the control circuit is to repeat the transient response test one or more times to determine the second value.

16. The processing unit of claim 13, wherein the ICL circuit comprises:
a voltage regulator (VR) block to determine a voltage for the circuit;
an analog-to-digital converter (ADC) to convert the input current of the circuit to a digital signal, wherein the control circuit is to receive a copy of the digital signal; and
a proportional-integral-derivative (PID) control block, wherein the PID control block is to control the VR block based on at least the digital signal and the first value, wherein the input current setting comprises a proportional gain parameter, an integral gain parameter, and a derivative gain parameter; and
a frequency-locked loop (FLL) block coupled to the VR block, wherein the FLL block is to determine a frequency for the circuit.

17. The processing unit of claim 13, wherein the ICL circuit comprises a proportional-integral-derivative (PID) control block, wherein the control circuit is further to:
- determine that the number of peaks of the input current is equal to or less than a maximum number of peaks;
- determine that the third value is equal to or less than a maximum amount of overshoot; and
- determine that the fourth value is equal to or less than a maximum amount of setup time.

18. The processing unit of claim 13, wherein the ICL circuit comprises a proportional-integral-derivative (PID) control block, wherein the input current setting comprises:
a proportional gain parameter;
an integral gain parameter; and
a derivative gain parameter, wherein the control circuit is to determine the second value by varying different combinations of the proportional gain parameter, the integral gain parameter, and the derivative gain parameter over one or more transient response tests.

* * * * *